United States Patent
Klug et al.

(10) Patent No.: US 9,991,021 B2
(45) Date of Patent: *Jun. 5, 2018

(54) LASER-WELDABLE ELECTROSTATICALLY DISSIPATIVE POLYOXYMETHYLENE BASED ON STAINLESS STEEL FIBERS

(71) Applicant: Ticona LLC, Florence, KY (US)

(72) Inventors: Jeremy Hager Klug, Union, KY (US); Dwight D. Smith, Milton, IN (US); Richard Novaco, Auburn Hills, MI (US)

(73) Assignee: Ticona LLC, Florence, KY (US)

(*) Notice: Subject to any disclaimer, the term of this patent is extended or adjusted under 35 U.S.C. 154(b) by 154 days.

This patent is subject to a terminal disclaimer.

(21) Appl. No.: 14/094,969

(22) Filed: Dec. 3, 2013

(65) Prior Publication Data

US 2014/0166940 A1 Jun. 19, 2014

Related U.S. Application Data

(60) Provisional application No. 61/736,576, filed on Dec. 13, 2012, provisional application No. 61/774,976, filed on Mar. 8, 2013.

(51) Int. Cl.
*H01B 1/02* (2006.01)
*H01B 1/22* (2006.01)
(Continued)

(52) U.S. Cl.
CPC ........... *H01B 1/22* (2013.01); *B29C 65/1635* (2013.01); *B29C 65/1677* (2013.01);
(Continued)

(58) Field of Classification Search
CPC ....................................................... H01B 1/02
(Continued)

(56) References Cited

U.S. PATENT DOCUMENTS 3,704,275 A * 11/1972 Burg et al. .................... 524/425
4,181,685 A * 1/1980 Kern et al. ..................... 525/402
(Continued)

FOREIGN PATENT DOCUMENTS

EP 0 623 935 A1 11/1994
EP 0 733 667 A1 9/1996
(Continued)

OTHER PUBLICATIONS

Abstract of German Patent—DE4007766, Sep. 19, 1991, 2 pages.
(Continued)

*Primary Examiner* — William Young
(74) *Attorney, Agent, or Firm* — Dority & Manning, P.A.

(57) ABSTRACT

Polymer compositions containing a polyoxymethylene base polymer that is compounded with a conductive filler and pigment carbon black are disclosed that exhibit electrostatic dissipative (ESD) capabilities while also being laser weldable. The polymer composition can be formed into shaped or molded articles such as filters, flanges, connectors, etc. for use in fuel systems where conductivity, ductility, weldability, and resistance to aggressive fuels are required. The compositions can be compounded into a pellet product which can then be formed into a shaped article that complies with the ESD capabilities required by SAE J1645. At the same time, parts produced from the compositions can absorb laser energy sufficiently to form a high quality welded interface with parts produced from other compositions that are transparent to laser radiation and cannot absorb laser energy sufficiently.

8 Claims, 1 Drawing Sheet

(51) Int. Cl.
*C08J 3/22* (2006.01)
*C08K 3/04* (2006.01)
*B29C 65/16* (2006.01)
*C08K 7/06* (2006.01)
*B29C 65/00* (2006.01)
*B29L 31/14* (2006.01)
*C08K 3/08* (2006.01)

(52) U.S. Cl.
CPC .............. *B29C 66/54* (2013.01); *B29C 66/71* (2013.01); *B29C 66/73141* (2013.01); *B29C 66/73921* (2013.01); *C08J 3/22* (2013.01); *C08K 3/04* (2013.01); *C08K 7/06* (2013.01); *B29C 66/1142* (2013.01); *B29C 66/7212* (2013.01); *B29L 2031/14* (2013.01); *C08K 2003/0856* (2013.01); *C08K 2201/001* (2013.01); *H01B 1/02* (2013.01)

(58) Field of Classification Search
USPC ........................................................ 252/512
See application file for complete search history.

(56) References Cited

U.S. PATENT DOCUMENTS

| | | | |
|---|---|---|---|
| 4,391,741 A | | 7/1983 | Masamoto et al. |
| 4,555,357 A | | 11/1985 | Kausga et al. |
| 4,828,755 A | | 5/1989 | Kusumgar et al. |
| 4,831,073 A | | 5/1989 | Okushiro et al. |
| 4,937,312 A | | 6/1990 | Collins et al. |
| 4,942,208 A | * | 7/1990 | Forschirm et al. ............ 525/414 |
| 5,076,920 A | | 12/1991 | Danowski et al. |
| 5,164,084 A | | 11/1992 | Danowski et al. |
| 5,164,879 A | | 11/1992 | Danowski et al. |
| 5,190,582 A | * | 3/1993 | Shinozuka et al. ........ 106/31.65 |
| 5,641,824 A | | 6/1997 | Forschirm |
| 5,769,061 A | | 6/1998 | Nagata et al. |
| 5,902,517 A | * | 5/1999 | Thielen ......................... 252/511 |
| 6,262,165 B1 | | 7/2001 | Ariyasu et al. |
| 6,489,388 B1 | | 12/2002 | Kurz et al. |
| 6,790,385 B2 | | 9/2004 | Schleith et al. |
| 7,396,492 B2 | | 7/2008 | Price et al. |
| 7,648,653 B2 | | 1/2010 | Krueger et al. |
| 7,915,350 B2 | * | 3/2011 | Schmalz et al. .............. 525/398 |
| 8,318,866 B2 | | 11/2012 | Kurz et al. |
| 2002/0038921 A1 | * | 4/2002 | Okamura ............. B29B 17/0042 264/105 |
| 2006/0108064 A1 | | 5/2006 | Mori |
| 2007/0235693 A1 | * | 10/2007 | Price et al. .................... 252/500 |
| 2011/0114189 A1 | | 5/2011 | Crain et al. |
| 2012/0163999 A1 | * | 6/2012 | Becker ................. A61M 5/1413 417/53 |

FOREIGN PATENT DOCUMENTS

| | | |
|---|---|---|
| WO | WO 2004046244 A1 | 6/2004 |
| WO | WO 2012049287 A | 4/2012 |
| WO | WO 2012049293 A1 | 4/2012 |

OTHER PUBLICATIONS

Abstract of German Patent—DE19717324, Mar. 5, 1998, 1 page.
Abstract of German Patent—DE102007006004, Aug. 14, 2008, 1 page.
Abstract of Japanese Patent—JP2005263929, Sep. 29, 2005, 1 page.
Abstract of Japanese Patent—JP2005330463, Dec. 2, 2005, 2 pages.
Abstract of Japanese Patent—JP2006077160, Mar. 23, 2006, 1 page.
Abstract of Japanese Patent—JP2009078526, Apr. 16, 2009, 2 pages.
Abstract of Japanese Patent—JP2009256538, Nov. 5, 2009, 1 page.
Abstract of Japanese Patent—JP2009286961, Dec. 10, 2009, 1 page.
Abstract of WO Patent—WO0236329, May 10, 2002, 2 pages.
Search Report and Written Opinion for PCT/US2013/072796 dated Mar. 21, 2014, 15 pages.
Abstract and Machine Translation of WO 201311355, Aug. 8, 2013, 16 pages.

* cited by examiner

US 9,991,021 B2

LASER-WELDABLE ELECTROSTATICALLY DISSIPATIVE POLYOXYMETHYLENE BASED ON STAINLESS STEEL FIBERS

RELATED APPLICATIONS

The present application claims priority to U.S. Provisional Application Ser. Nos. 61/736,576, filed on Dec. 13, 2012, and 61/774,976, filed on Mar. 8, 2013, which are incorporated herein in their entirety by reference thereto.

BACKGROUND OF THE INVENTION

Polyacetal polymers, which are commonly referred to as polyoxymethylene polymers, have become established as exceptionally useful engineering materials in a variety of applications. Polyoxymethylene polymers, for instance, are widely used in constructing molded parts, such as parts for use in the automotive industry and the electrical industry. Polyoxymethylene polymers have excellent mechanical properties, fatigue resistance, abrasion resistance, and chemical resistance.

Although polyoxymethylene polymers have excellent physical characteristics, the polymers may not be suitable components in certain applications, such as in fuel transfer applications, where the risk of a spark or explosion is increased. Because the electrical resistances within plastics such as polyoxymethylene are usually very high, there is a risk of electrostatic charging, which can be disruptive and even dangerous in certain application sectors, such as in the fuel and automotive sectors. This risk is due to the inability of the polymers to dissipate electrical charge. For instance, unlike metallic components, which provide an electrical pathway for electrical charges to move freely to ground, when a non-conductive, plastic component is used, such a pathway is removed, leaving no way for charges to drain to ground. This, in turn, creates a risk of sparking or explosion when a plastic component is used. As such, fillers including metal fibers such as stainless steel fibers or electro-conductive (EC) carbon black can be added to polyoxymethylene to impart the polyoxymethylene with electrostatic dissipative (ESD) capabilities. However, problems exist in the laser welding of such polyoxymethylenes having ESD capabilities because these polyoxymethylenes do not absorb laser energy sufficiently to form a high quality weld interface. This can be problematic in the construction of certain articles such as filter housings, flanges, pressure vessel connectors, fuel line connectors, or other parts that require both electrical conductivity and laser weldability.

In view of the above, a need exists for a laser-weldable polyoxymethylene polymer composition that also has electrostatic dissipative (ESD) capabilities and articles formed from such a composition.

SUMMARY OF THE INVENTION

Generally speaking, the present disclosure is directed to a polyoxymethylene composition that exhibits ESD capabilities and that is laser weldable. The polymer composition can be formed into a part through any suitable process such as extrusion, injection molding, blow molding, etc. The part can be formed into any suitable shape and can be a component of any article requiring conductivity, weldability, and resistance to aggressive fuels, such as a filter housing, a flange, a connector, etc.

Of particular advantage, the polymer composition of the present disclosure includes a base polyoxymethylene polymer blended with a conductive filler such that the polymer composition has ESD capabilities. Further, so that the polymer composition can be laser weldable, the polymer composition also includes a pigment carbon black. Other polyoxymethylenes in addition to the base polyoxymethylene, such as a high flow polyoxymethylene, can be included in the composition if desired. Moreover, additives can also be included in the polymer composition such as antioxidants, nucleants, formaldehyde scavengers, compatibilizers, UV stabilizers, light stabilizers, acid scavengers, etc.

In one embodiment, the base polyoxymethylene has a melt flow rate of from about 2.5 grams per 10 minutes to about 12 grams per 10 minutes at 190° C. and a 2.16 kilogram load. In another embodiment, the base polyoxymethylene can be an impact modified polyoxymethylene comprising a functionalized polyoxymethylene, a thermoplastic elastomer, and a coupling agent. In still another embodiment, the base polyoxymethylene can be an aggressive fuel resistant polyoxymethylene comprising a polyoxymethylene having a melt flow rate of from about 3 grams per 10 minutes to about 55 grams per 10 minutes at 190° C. and a 2.16 kilogram load, a polyalkylene glycol, and a metal oxide. In yet another embodiment, the base polyoxymethylene is present in the polymer composition in an amount ranging from about 45% by weight to about 95% by weight based on the total weight of the polymer composition.

Further, the conductive filler can comprise a metal powder, metal flakes, metal fibers, carbon powder, carbon fibers, carbon black, carbon nanotubes, or combinations thereof. In one particular embodiment, the conductive filler comprises stainless steel fibers. The conductive filler can be present in the polymer composition in an amount ranging from about 1% by weight to about 25% by weight based on the total weight of the polymer composition.

Meanwhile, the high flow polyoxymethylene that can be used in the polymer composition can have a melt flow rate of from about 14 grams per 10 minutes to about 55 grams per 10 minutes at 190° C. and a 2.16 kilogram load. The high flow polyoxymethylene can be present in the polymer composition in an amount ranging from about 1% by weight to about 25% by weight based on the total weight of the polymer composition.

Further, the pigment carbon black can be present in an amount ranging from about 0.01% by weight to about 2% by weight based on the total weight of the polymer composition. In one embodiment, the pigment carbon black has a dibutyl phthalate absorption of from about 40 milliliters per 100 grams to about 95 milliliters per 100 grams, as determined according to ASTM 2414.

In yet another embodiment, the polymer composition can comprise an antioxidant, wherein the antioxidant is present in an amount ranging from about 0.05% by weight to about 2% by weight based on the total weight of the polymer composition. In a further embodiment, the polymer composition can comprise a formaldehyde scavenger, wherein the formaldehyde scavenger is present in an amount ranging from about 0.05% by weight to about 2% by weight based on the total weight of the polymer composition. In an additional embodiment, the polymer composition can comprise a nucleant, wherein the nucleant is present in an amount ranging from about 0.05% by weight to about 2% by weight based on the total weight of the polymer composition. In still another embodiment, the polymer composition can comprise a lubricant, wherein the lubricant is present in an amount ranging from about 0.05% by weight to about 2% by weight based on the total weight of the polymer composition. In one more embodiment, the polymer composition can comprise a compatibilizer, wherein the compatibilizer is present in an amount ranging from about 0.005% by weight to about 1% by weight based on the total weight of the polymer composition.

The polymer composition of the present disclosure can be formed by fully compounding the base polyoxymethylene, the conductive filler, and the pigment carbon black into a homogeneous blend. The aforementioned polymer composition can be used to form a part or component of a shaped article such as a filter housing, flange, a pressure vessel connector, or a fuel line connector which has ESD capabilities to reduce the risk of explosion due to charge build, as is required in many fuel applications, and can be laser welded to another part of the shaped article. For instance, the part or component made from the polymer composition of the present disclosure can be laser welded to another part of the shaped article, such as a part made of a standard polyoxymethylene, which is transparent to laser radiation and thus cannot absorb the incident energy as required during laser welding to create enough heat to create a sufficient weld.

Other features and aspects of the present disclosure are discussed in greater detail below.

BRIEF DESCRIPTION OF THE FIGURES

A full and enabling disclosure of the present invention, including the best mode thereof to one skilled in the art, is set forth more particularly in the remainder of the specification, including reference to the accompanying FIGURE, in which.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polymer composition that is well suited to being molded into articles that are ductile, have exceptional fuel performance characteristics, and are also laser weldable. The composition is formulated so as to increase the electrostatic dissipative (ESD) capabilities of the composition sufficient to satisfy SAE J1645 material and part requirements for conductivity of plastic materials for use in fuel systems. For instance, articles or parts of articles formed from the polymer composition of the present disclosure can have a volume resistivity of less than $10^6$ Ohm-cm. As such, the polymer composition can be molded into articles for use in fuel or automotive applications. Further, the polymer composition is formulated so that a part formed from the polymer composition can absorb incident energy during laser welding and can convert this to heat efficiently to create a sufficient weld between the part formed from the composition of the present disclosure and another part.

More particularly, the polymer composition of the present disclosure comprises a base polyoxymethylene, a conductive filler, a pigment carbon black, optional additional polyoxymethylenes (i.e., a high flow polyoxymethylene) and optional additives that can be formed into a molded article. The combination of the base polyoxymethylene with the conductive filler has been found to improve the ESD capabilities of articles made from the polymer composition, and thus the polymer composition of the present disclosure is suitable for use in applications where dissipation of electric charge is desired.

Further, the addition of the pigment carbon black permits a part or component formed from the polymer composition of the present disclosure to sufficiently absorb incident energy during laser welding so that it can convert this energy to heat in an efficient manner to create a secure weld between the part formed from the polymer composition and another part, such as a part formed from a natural polyoxymethylene that is transparent to laser radiation.

The components of polymer composition will now be discussed in more detail. First, the base polyoxymethylene can be a generally unbranched linear polymer containing at least 80%, such as at least 90%, of oxymethylene units ($—CH_2O—$). Further, the base polyoxymethylene can have a melt flow rate of from about 2.5 grams per 10 minutes to about 12 grams per 10 minutes, such as from about at 5 grams per 10 minutes to about 10 grams per 10 minutes at 190° C. and a 2.6 kilogram load in accordance with ASTM D1238-82. The base polyoxymethylene can be present in the polymer composition in an amount ranging from about 45% by weight to about 98% by weight, such as in an amount ranging from about 55% by weight to about 95% by weight, such as in an amount ranging from about 60% by weight to about 90% by weight based on the total weight of the polymer composition.

In addition to the base polyoxymethylene composition discussed above, the polymer composition of the present disclosure further comprises a conductive filler, a high-flow polyoxymethylene, and a black pigment concentrate comprising pigment carbon black.

The conductive filler can include conductive particles, powders, fibers or combinations thereof. For instance, the conductive filler may comprise metal powders, metal flakes, metal fibers (i.e., stainless steel fibers), carbon powder, carbon fibers, electro-conductive (EC) carbon black, carbon nanotubes, or combinations thereof. Further, the conductive filler can be present in the polymer composition in an amount ranging from about 1% by weight to about 25% by weight, such as in an amount ranging from about 2% by weight to about 20% by weight, such as in an mount ranging from about 3% by weight to about 15% by weight based on the total weight of the polymer composition.

Further, although not required, a high flow polyoxymethylene polymer can be blended with the conductive filler and base polyoxymethylene. The high flow polyoxymethylene can have a melt flow rate of from about 14 grams per 10 minutes to about 55 grams per 10 minutes, such as from about 20 grams per 10 minutes to about 45 grams per 10 minutes at 190° C. and a 2.16 kilogram load in accordance with ASTM 01238-82. The high flow polyoxymethylene can be present in the polymer composition in an amount ranging from about 1% by weight to about 25% by weight, such as in an amount ranging from about 2% by weight to about 20% by weight, such as in an amount ranging from about 3% by weight to about 15% by weight based on the total weight of the polymer composition.

Additionally, a pigment carbon black is compounded with the base polyoxymethylene and other components. The pigment carbon black can be included in a black pigment concentrate that contains the pigment carbon black and other fillers. The pigment carbon black can be present in the concentrate in an amount ranging from about 2% by weight to about 25% by weight, such as in an amount ranging from about 5% by weight to about 20% by weight, such as in an amount ranging from about 10% by weight to about 15% by weight based on the total weight of the black pigment concentrate. Regardless of the concentrate used, the pigment carbon black can be present in the polymer composition in an amount ranging from about 0.01% by weight to about 2% by weight, such as in an amount ranging from about 0.1% by weight to about 1% by weight, such as in an amount ranging from about 0.25% by weight to about 0.75% by weight based on the total weight of the polymer composition.

In addition to the components discussed above, the polymer composition can contain various additives such as nucleants, lubricants, antioxidants, UV light absorbers, light stabilizers, formaldehyde scavengers, acid scavengers, compatibilizers, etc. These components can each be present in the composition in an amount less than about 2% by weight, such as in an amount less than about 1.5% by weight, such as in an amount less than about 1.0% by weight based on the total weight of the polymer composition.

As described above, the polymer composition of the present disclosure dramatically improves the electrostatic dissipative (ESD) and laser welding capabilities of standard polyoxymethylene. Of particular advantage, molded parts made from the disclosed polymer composition are well suited for use in fuel applications where ESD capabilities are required. Further, the molded parts made from the polymer composition described above are laser weldable in that they can absorb the incident energy from the laser and covert this to heat efficiently. Generally, the polymer composition of the present disclosure contains a base polyoxymethylene, a conductive filler, pigment carbon black, an optional high flow polyoxymethylene, and optional additives, and each of these components are discussed in more detail below.

Standard Base Polyoxymethylene

In the present disclosure, the base polyoxymethylene to be rendered electrostatically dissipative and laser weldable is generally an unbranched linear polymer that contains at least 80%, such as at least 90%, of oxymethylene units (—$CH_2O$—). It should be understood that the term polyoxymethylene here encompasses homopolymers of formaldehyde or of its cyclic oligomers, such as trioxane or tetroxane, and also corresponding copolymers, terpolymers and the like.

Polyoxymethylene homopolymers are prepared conventionally by polymerizing anhydrous formaldehyde or the trimer, trioxane. Polyoxymethylenes of suitable molecular weight for use herein may be prepared by polymerizing trioxane in the presence of Lewis acid catalysts such as antimony fluoride or boron trifluoride.

As is well known, ex reactor polyoxymethylene is stabilized predominantly by either end capping (e.g., acetylation of terminal hemiacetal via ester or ether groups) or by hydrolysis.

In one embodiment, polyoxymethylene copolymers with a proportion of 60% to 99.9% of recurring units being oxymethylene interspersed with the balance of oxy(higher alkylene) groups can be used to form the base polyoxymethylene. Oxy(higher alkylene) groups are introduced via cyclic ether or cyclic formal having at least two adjacent carbon atoms in the ring in addition to trioxane, such as via ethylene oxide 1,3-dioxolane with trioxane. Mention may be made of cyclic ethers ethylene oxide, propylene 1,2-oxide, butylene 1,2-oxide, butylene 1,3-oxide, 1,3-dioxane, 1,3-dioxolane, and 1,3-dioxepan, and also linear oligo- or polyformals, such as polydioxolane or polydioxepan as comonomers. The polyoxymethylene resins used herein have a number average molecular weight of at least 10,000 and I.V.

of least 1.0 (at 25° C. in a 0.2 wt. % solution in hexafluoroisopropanol). Additionally, the polyoxymethylene copolymers have melting points of at least 150° C. and a weight average molecular weight ranging from about 5000 to about 200,000, such as from about 7000 to about 150,000. Particular preference is given to end-group-stabilized polyoxymethylene polymers which have carbon-carbon bonds at the ends of the chains. Useful polyoxymethylene resins are crystalline, and have a melt flow rate of from about 2.5 grams per 10 minutes to about 12 grams per 10 minutes, such as CELCON® having a melt flow rate of from about 5 to about 10 grams per 10 minutes at 190° C. and a 2.16 kilogram load, in accordance with ASTM D1238-82.

Alternative Impact Modified Base Polyoxymethylene

In an alternative embodiment, instead of a standard base polyoxymethylene as discussed above, the base polyoxymethylene with which to impart ESD characteristics and laser weldability can be an impact modified base polyoxymethylene. For instance, the impact modified base polyoxymethylene comprises a polyoxymethylene having functional end groups. Generally, the preparation of the polyoxymethylene that is part of the impact modified base polyoxymethylene can be carried out by polymerization of polyoxymethylene-forming monomers, such as trioxane or a mixture of trioxane and dioxolane, in the presence of ethylene glycol as a molecular weight regulator. The polymerization can be effected as precipitation polymerization or in the melt. By a suitable choice of the polymerization parameters, such as duration of polymerization or amount of molecular weight regulator, the molecular weight and hence the MVR value of the resulting polymer can be adjusted. The above-described procedure for the polymerization can lead to polymers having comparatively small proportions of low molecular weight constituents. If a further reduction in the content of low molecular weight constituents were to be desired, this can be effected by separating off the low molecular weight fractions of the polymer after the deactivation and the degradation of the unstable fractions after treatment with a basic protic solvent. This may be a fractional precipitation from a solution of the stabilized polymer; polymer fractions of different molecular weight distribution being obtained.

In one embodiment, a polyoxymethylene polymer with hydroxyl terminal groups can be produced using a cationic polymerization process followed by solution hydrolysis to remove any unstable end groups. During cationic polymerization, a glycol, such as ethylene glycol can be used as a chain terminating agent. The cationic polymerization results in a bimodal molecular weight distribution containing low molecular weight constituents. In one particular embodiment, the low molecular weight constituents can be significantly reduced by conducting the polymerization using a heteropoly acid such as phosphotungstic acid as the catalyst. When using a heteropoly acid as the catalyst, for instance, the amount of low molecular weight constituents can be less than about 2% by weight.

A heteropoly acid refers to polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by the formula:

$$H_x[M_mM'_nO_z]yH_2O$$

wherein

M represents an element selected from the group consisting of P, Si, Ge, Sn, As, Sb, U, Mn, Re, Cu, Ni, Ti, Co, Fe, Cr, Th or Ce, M' represents an element selected from the group consisting of W, Mo, V or Nb, m is 1 to 10, n is 6 to 40, z is 10 to 100, x is an integer of 1 or above, and y is 0 to 50.

The central element (M) in the formula described above may be composed of one or more kinds of elements selected from P and Si and the coordinate element (M') is composed of at least one element selected from W, Mo and V, particularly W or Mo.

Specific examples of heteropoly acids are phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The heteropoly acid may be dissolved in an alkyl ester of a polybasic carboxylic acid. It has been found that alkyl esters of polybasic carboxylic acid are effective to dissolve the heteropoly acids or salts thereof at room temperature (25° C.).

The alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of the formula:

(ROOC)—(CH$_2$)$_n$—(COOR')

wherein n is an integer from 2 to 12, preferably 3 to 6, and

R and R' represent independently from each other an alkyl group having 1 to 4 carbon atoms, preferably selected from the group consisting of methyl, ethyl, n-propyl, iso-propyl, n-butyl, iso-butyl and tert-butyl, In one embodiment, the polybasic carboxylic acid comprises the dimethyl or diethyl ester of the above-mentioned formula, such as a dimethyl adipate (DMA).

The alkyl ester of the polybasic carboxylic acid may also be represented by the following formula:

(ROOC)$_2$—CH—(CH$_2$)$_m$—CH—(COOR')$_2$ wherein m is an integer from 0 to 10, preferably from 2 to 4, and R and R' are independently from each other alkyl groups having 1 to 4 carbon atoms, preferably selected from the group consisting of methyl, ethyl, n-propyl, iso-propyl, n-butyl, iso-butyl and tert.-butyl.

Particularly preferred components which can be used to dissolve the heteropoly acid according to the above formula are butantetracarboxylic acid tetratethyl ester or butantetracarboxylic acid tetramethyl ester.

Specific examples of the alkyl ester of a polybasic carboxylic acid are dimethyl glutaric acid, dimethyl adipic acid, dimethyl pimelic acid, dimethyl suberic acid, diethyl glutaric acid, diethyl adipic acid, diethyl pimelic acid, diethyl suberic acid, dimethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof. Other examples include dimethylisophthalate, diethylisophthalate, dimethylterephthalate or diethylterephthalate.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

In some embodiments, the polyoxymethylene used in the impact modified base polyoxymethylene may contain other polyoxymethylene homopolymers and/or polyoxymethylene copolymers. Such polymers, for instance, are generally unbranched linear polymers which contain as a rule at least 80%, such as at least 90%, oxymethylene units. Such conventional polyoxymethylenes may be present in the impact modified base polyoxymethylene as long as the resulting mixture maintains the above amounts of hydroxyl terminated groups and the above amounts of low molecular weight constituents.

In one embodiment, the polyoxymethylene used in the impact modified base polyoxymethylene is functionalized and has a content of terminal hydroxyl groups of at least 5 mmol/kg, such as at least 10 mmol/kg, such as at least 15 mmol/kg. In one embodiment, the terminal hydroxyl group content ranges from 18 to 50 mmol/kg.

Further, in addition to the terminal hydroxyl groups, the functionalized polyoxymethylene used in the impact modified base polyoxymethylene may also have other terminal groups usual for these polymers. Examples of these are alkoxy groups, formate groups, acetate groups or aldehyde groups. According to one embodiment, the polyoxymethylene is a homo- or copolymer which comprises at least 50 mol. %, such as at least 75 mol. %, such as at least 90 mol. % and such as even at least 95 mol. % of —CH$_2$O— repeat units.

In addition to having a relatively high terminal hydroxyl group content, the functionalized polyoxymethylene utilized in the impact modified base polyoxymethylene may have a relatively low amount of low molecular weight constituents. As used herein, low molecular weight constituents (or fractions) refer to constituents having molecular weights below 10,000 Daltons. For example, the polyoxymethylene can contain low molecular weight constituents in an amount less than about 15% by weight, based on the total weight of the polyoxymethylene. In certain embodiments, for instance, the polyoxymethylene may contain low molecular weight constituents in an amount less than about 10% by weight, such as less than about 5% by weight, such as in an amount less than about 3% by weight, such as even in an amount less than about 2% by weight.

Further, the functionalized polyoxymethylene used in forming the impact modified base polyoxymethylene can generally have a melt volume rate (MVR) of less than 50 cm$^3$/10 min, such as from about 1 to about 40 cm$^3$/10 min, such as from about 2 to about 20 cm$^3$/10 min determined according to ISO 1133 at 190° C. and a 2.16 kilogram load.

It is to be understood that the term polyoxymethylene comprises both homopolymers of formaldehyde or its cyclic oligomers, such as trioxane or 1,3,5,7-tetraoxacyclooctane, and corresponding copolymers. For example the following components can be used in the polymerization process: ethyleneoxide, 1,2-propyleneoxide, 1,2-butyleneoxide, 1,3-butyleneoxide, 1,3-dioxane, 1,3-dioxolane, 1,3-dioxepane and 1,3,6-trioxocane as cyclic ethers as well as linear oligo- or polyformales, like polydioxolane or polydioxepane.

Further, polyoxymethylenes which are prepared by copolymerization of trioxane and the formal of trimethylolpropane (ester), of trioxane and the alpha, alpha and the alpha, beta-isomers of glyceryl formal (ester) or of trioxane and the formal of 1,2,6-hexantriol (ester) can be used in forming the functionalized polyoxymethylene.

Such polyoxymethylene homo- or copolymers are known per se to the person skilled in the art and are described in the literature.

The amount of functionalized polyoxymethylene polymer (i.e., POM-OH) present in the polymer composition of the present disclosure can vary depending upon the particular application. In one embodiment, for instance, the polymer composition contains functionalized polyoxymethylene polymer in an amount ranging from about 30% by weight to about 90% by weight, such as in an amount ranging from about 40% by weight to about 85% by weight, such as in an amount ranging from about 50% by weight to about 80% by weight based on the total weight of the polymer composition.

In addition to a functionalized polyoxymethylene, the impact modified base polyoxymethylene further comprises an impact modifier such as a thermoplastic elastomer if it is desired that the overall polymer composition exhibit increased stiffness and strength. Thermoplastic elastomers are materials with both thermoplastic and elastomeric properties. Thermoplastic elastomers include styrenic block copolymers, polyolefin blends referred to as thermoplastic olefin elastomers, elastomeric alloys, thermoplastic polyurethanes, thermoplastic copolyesters, and thermoplastic polyamides.

Thermoplastic elastomers well suited for use in the present disclosure are polyester elastomers (TPE-E), thermoplastic polyamide elastomers (TPE-A) and in particular thermoplastic polyurethane elastomers (TPE-U). The above thermoplastic elastomers have active hydrogen atoms which can be reacted with coupling reagents and/or the polyoxymethylene polymer. Examples of such groups are urethane groups, amido groups, amino groups or hydroxyl groups. For instance, terminal polyester diol flexible segments of thermoplastic polyurethane elastomers have hydrogen atoms which can react, for example, with isocyanate groups.

In one particular embodiment, a thermoplastic polyurethane elastomer is used. The thermoplastic polyurethane elastomer, for instance, may have a soft segment of a long-chain diol and a hard segment derived from a diisocyanate and a chain extender. In one embodiment, the polyurethane elastomer is a polyester type prepared by reacting a long-chain diol with a diisocyanate to produce a polyurethane prepolymer having isocyanate end groups, followed by chain extension of the prepolymer with a diol chain extender. Representative long-chain diols are polyester diols such as polybutylene adipate)diol, poly(ethylene adipate)diol and poly(ε-caprolactone)diol; and polyether diols such as poly(tetramethylene ether)glycol, polypropylene oxide)glycol and poly(ethylene oxide)glycol. Suitable diisocyanates include 4,4'-methylenebis(phenyl isocyanate), 2,4-toluene diisocyanate, 1,6-hexamethylene diisocyanate and 4,4'-methylenebis-(cycloxylisocyanate). Suitable chain extenders are $C_2$-$C_6$ aliphatic diols such as ethylene glycol, 1,4-butanediol, 1,6-hexanediol and neopentyl glycol. One example of a thermoplastic polyurethane is characterized as essentially poly(adipic acid-co-butylene glycol-co-diphenylmethane diisocyanate).

In one particular embodiment, a thermoplastic polyurethane elastomer is used that contains carbonate groups. The thermoplastic polyurethane elastomer, for instance, may have at least one soft segment containing carbonate groups.

Thermoplastic elastomers containing carbonate groups can be produced, in one embodiment, using a diol component that contains carbonate groups. For instance, the thermoplastic elastomer can be produced as described above by reacting together a polymer diol containing carbonate groups with an isocyanate and a chain extender. The polymer diol, for instance, may comprise a polycarbonate diol and/or a polyester polycarbonate diol.

A polycarbonate diol may be produced by reacting a diol with a carbonate compound. The carbonate compound may comprise, for instance, a carbonate compound with alkyl groups, a carbonate compound with alkylene groups, or a carbonate compound containing aryl groups. Particular carbonate compounds include dimethyl carbonate, diethyl carbonate, ethylene carbonate, and/or diphenyl carbonate. A polyester polycarbonate, on the other hand, may be formed by reacting a diol with a carbonate compound as described above in the presence of a carboxylic acid.

As described above, the polycarbonate groups contained in the thermoplastic elastomer are generally referred to as soft segments. Thus, the polycarbonate groups have a tendency to lower the hardness of the thermoplastic elastomer. In one embodiment, for instance, the Shore A hardness of the thermoplastic elastomer is less than about 98, such as less than about 95, such as less than about 93 when tested according to ISO Test 868. The Shore A hardness of the material is generally greater than about 80, such as greater than about 85.

The amount of thermoplastic elastomer contained in the polymer composition can vary depending upon various factors. For instance, the thermoplastic elastomer can be present in an amount ranging from about 1% by weight to about 50% by weight, such as in an amount ranging from about 2.5% by weight to about 40% by weight, such as in an amount ranging from about 5% by weight to about 30% by weight based on the total weight of the polymer composition.

In one embodiment, the thermoplastic elastomer may be coupled to the functionalized polyoxymethylene via a coupling agent. The coupling agent can form bridging groups between the functionalized polyoxymethylene polymer the thermoplastic elastomer. Further, the coupling agent may be capable of forming covalent bonds with the terminal hydroxyl groups on the functionalized polyoxymethylene and with active hydrogen atoms on the thermoplastic elastomer. In this manner, the thermoplastic elastomer becomes coupled to the functionalized polyoxymethylene through covalent bonds.

In principle any coupling agent which is capable of reacting with nucleophilic groups such as —OH or —NH$_2$ can be used. A suitable coupling agent is a polyisocyanate, preferably organic diisocyanate, more preferably a polyisocyanate selected from the group consisting of aliphatic diisocyanates, cycloaliphatic diisocyanates, aromatic diisocyanates and mixtures thereof.

A wide range of polyfunctional, such as trifunctional or bifunctional coupling agents, may be used. In one embodiment, the coupling agent comprises a diisocyanate, such as an aliphatic, cycloaliphatic and/or aromatic diisocyanate. The coupling agent may be in the form of an oligomer, such as a trimer or a dimer.

In one embodiment, the coupling agent comprises a diisocyanate or a triisocyanate which is selected from 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4"-triisocyanate; naphthylene-1,5-diisocyanate; 2,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4"-bis(isocyanatomethyl) dicyclohexane; 2,4'-bis(isocyanatomethyl) dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-tetra-methylhexane, 1,6-diisocyanato-2,4,4-tetra-trimethylhexane, trans-cyclohexane-1,4-diisocyanate, 3-isocyanato-methyl-3,5,5-trimethylcyclo-hexyl isocyanate, 1-isocyanato-3,3,5-trimethyl-5-isocyanatomethylcyclohexane, cyclo-hexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, or mixtures thereof.

In one embodiment, an aromatic polyisocyanate is used, such as 4,4'-diphenylmethane diisocyanate (MDI).

When utilizing an impact modified base polyoxymethylene, the polymer composition generally contains the coupling agent in an amount from about 0.05% to about 10% by weight, such as in an amount ranging from about 0.075% by weight to about 7.5% by weight, such as in an amount ranging from about 0.1% by weight to about 5% by weight based on the total weight of the polymer composition. To ensure that the thermoplastic elastomer has been completely coupled to the functionalized polyoxymethylene, in one embodiment, the coupling agent can be added in molar excess amounts when comparing the reactive groups on the coupling agent with the amount of terminal hydroxyl groups on the functionalized polyoxymethylene.

Alternative Aggressive Fuel Resistant Base Polyoxymethylene

Besides utilizing a standard base polyoxymethylene or an impact modified base polyoxymethylene, the present disclosure also contemplates the use of a base polyoxymethylene that has been modified to exhibit increased toughness so that it can be more resistant to aggressive fuels. For instance, the base polyoxymethylene can include polyoxymethylene, polyalkylene glycol, and metal oxide.

The polyoxymethylene can include essentially unbranched linear polymers which generally comprise at least 80%, preferably at least 90%, of oxymethylene units ($-CH_2O-$). Preferred for use herein are polyoxymethylene copolymers with a proportion of 60-99.9% of recurring units being oxymethylene interspersed with the balance of oxy (higher alkylene) groups. Oxy(higher alkylene) groups are introduced via cyclic ether or cyclic formal having at least two adjacent carbon atoms in the ring in addition to trioxane, e.g., via ethylene oxide 1,3-dioxolane with trioxane. Mention may be made of cyclic ethers ethylene oxide, propylene 1,2-oxide, butylene 1,2-oxide, butylene 1,3-oxide, 1,3-dioxane, 1,3-dioxolane, and 1,3-dioxepan, and also linear oligo- or polyformals, such as polydioxolane or polydioxepan as comonomers. The preferred polyoxymethylene resins used herein have a number average molecular weight of at least 10,000 and I.V. of least 1.0 (at 25° C. in a 0.2 weight % solution in hexafluoroisopropanol). The preferred polyoxymethylene copolymers have melting points of at least 150° C. and a weight average molecular weight in the range from 5000 to 200,000, and preferably a weight average molecular weight of from 7000 to 150,000. Particular preference is given to end-group-stabilized polyoxymethylene polymers which have carbon-carbon bonds at the ends of the chains. Useful polyoxymethylene resins are crystalline, and have a melt flow rate of from about 3 grams per 10 minutes to about 55 grams per 10 minutes, with preferable grades including CELCON® with a melt flow rate of from about 6 grams per 10 minutes to about 23 grams per 10 minutes @ 190° C. and a 2.16 kilogram load in accordance with ASTM D1238-82. A more preferred polyoxymethylene is available from Ticona LLC having a melt flow rate of 14 grams per 10 minutes at 190° C. and a 2.16 kilogram load.

The polyoxymethylene can be present in the aggressive fuel base polyoxymethylene in an amount ranging from about 50% by weight to about 95% by weight, such as in an amount ranging from about 55% by weight to about 90% by weight, such as in an amount ranging from about 65% by weight to about 85% by weight based on the total weight of the polymer composition.

Meanwhile, the polyalkylene glycol is represented by:

wherein $R_1$ and $R_4$ represent hydrogen, alkyl groups having 1 to 30 carbon atoms, acyl groups having 1 to 30 carbon atoms; $R_2$ and $R_3$ represent the same or different alkylene groups having 2 to 6 carbon atoms; and n and m represent integers satisfying the condition of being 1 or more and n+m<1000. Suitable polyalkylene glycols used herein has a mean number average molecular weight of from 10,000 to 45,000, in particular from 20,000 to 40,000. Polyalkylene glycols are obtained in the conventional manner by polycondensation of alkylene glycol as a monomer, e.g., polyethylene glycol, polypropylene glycol or a polyethylene-glycol-polypropylene-glycol block polymer. The polymerization mole number is preferably in the range of 5 to 1,000, more preferably in the range of 10 to 500. Examples of the polyalkylene glycol include polyethylene glycol oleyl ether (ethylene oxide polymerization mole number of 5 to 50), polyethylene glycol cetyl ether (ethylene oxide polymerization mole number of 5 to 20), polyethylene glycol stearyl ether (ethylene oxide polymerization mole number of 5 to 30), polyethylene glycol lauryl ether (ethylene oxide polymerization mole number of 5 to 30), polyethylene glycol tridecylether (ethylene oxide polymerization mole number of 5 to 30), polyethylene glycol nonylphenyl ether (ethylene oxide polymerization mole number of 2 to 100) and polyethylene glycol octylphenyl ether (ethylene oxide polymerization mole number of 4 to 50). Other polyalkylene glycols suitable herein include polyethylene glycol monolaurate (ethylene oxide polymerization mole number of 2 to 30), polyethylene glycol monostearate (ethylene oxide polymerization mole number of 2 to 50) and polyethylene glycol monooleate (ethylene oxide polymerization mole number of 2 to 10). The polyalkylene glycols may be used individually or in combination.

The polyalkylene glycol can be present in the aggressive fuel base polyoxymethylene in an amount ranging from about 0.05% by weight to about 10% by weight, such as in an amount ranging from about 0.1% by weight to about 5% by weight, such as in an amount ranging from about 0.25% by weight to about 2.5% by weight based on the total weight of the polymer composition.

Further, the metal oxide can include oxides of zinc, magnesium, calcium, manganese oxide and the like. The metal oxide can be present in the aggressive fuel base polyoxymethylene in an amount ranging from about 0.05% by weight to about 10% by weight, such as in an amount ranging from about 0.1% by weight to about 5% by weight, such as in an amount ranging from about 0.25% by weight to about 2.5% by weight based on the total weight of the polymer composition.

In addition, the aggressive fuel base polyoxymethylene can contain other components such as a comb polymer and highly structured particulate carbon black, as discussed in U.S. Pat. No. 7,396,492 to Price, et al., which is incorporated herein in its entirety by reference thereto for all purposes. These additional components can each be present in an amount ranging from about 0.05% by weight to about 15% by weight, such as in an amount ranging from about 0.075% by weight to about 10% by weight, such as in an amount ranging about 0.1% by weight to about 5% by weight based on the total weight of the polymer composition.

Conductive Filler

Further, the base polyoxymethylene, whether it be a standard polyoxymethylene, an impact modified polyoxymethylene, or an aggressive fuel resistant polyoxymethylene as described in detail above, is compounded with a conductive filler such that the polymer composition of the present disclosure can exhibit ESD capabilities. The conductive filler can include conductive particles, powders, fibers or combinations thereof. For instance, the conductive filler may comprise metal powders, metal flakes, metal fibers (i.e., stainless steel fibers), carbon powder, carbon fibers, carbon black, carbon nanotubes, or combinations thereof. However, the present inventors have found that by using metal fibers such as stainless steel fibers, for example, a polymer composition having ESD capabilities that is more ductile and not as brittle as a polymer composition that includes electro-conductive carbon black can be formed.

Further, the conductive filler can be present in the polymer composition of the present disclosure in an amount ranging from about 1% by weight to about 25% by weight, such as in an amount ranging from about 2% by weight to about 20% by weight, such as in an amount ranging from about 3% by weight to about 15% by weight, based on the total weight of the polymer composition, Black Pigment Concentrate Additionally, a pigment carbon black is compounded with the base polyoxymethylene and conductive filler. The pigment carbon black can be included in a black pigment concentrate that contains the pigment carbon black as well as other components. The pigment carbon black can be present in the black pigment concentrate in an amount ranging from about 2% by weight to about 25% by weight, such as in an amount ranging from about 5% by weight to about 20% by weight, such as in an amount ranging from about 10% by weight to about 15% by weight based on the total weight of the black pigment concentrate. Meanwhile, the other components can be present in the black pigment concentrate in an amount ranging from about 75% by weight to about 98% by weight, such as in an amount ranging from about 80% by weight to about 95% by weight, such as in an amount ranging from about 85% by weight to about 90% weight based on the total weight of the black pigment concentrate.

The other components in the black pigment concentrate can include any of the polyoxymethylenes discussed above in reference to the base polyoxymethylene or the high flow polyoxymethylene discussed below. For instance, of the other components in the black pigment concentrate in addition to the pigment carbon black, from about 80% to about 99% can be a polyoxymethylene, from about 0.1% by weight to about 1% by weight can be a lubricant, from about 0.1% by weight to about 1% by weight can be a nucleant, from about 0.1% by weight to about 1% by weight can be an acid scavenger or antacid, and from about 0.1% by weight to about 1% by weight can be an antioxidant based on the total weight of the black pigment concentrate.

Without intending to be limited by theory, the present inventors have discovered that the use of a pigment carbon black, as opposed to highly structured carbon black, such as electro-conductive carbon black, permits a part formed from the polymer composition of the present disclosure to absorb laser energy sufficiently such that it can be laser welded to other parts when forming articles such as filters and flanges for use in fuel applications, connectors for use in pressure vessels, or connectors, such as quick connectors, for use in fuel lines. One example of a suitable pigment carbon black is RAVEN® 2000 pigment carbon black. The pigment carbon black generally has a dibutyl phthalate absorption (DBPA) according to ASTM 2414 of less than about 100 milliliters per 100 grams, such as from about 40 milliliters per 100 grams to about 95 milliliters per 100 grams, such as from about 50 milliliters per 100 grams to about 75 milliliters per 100 grams. In contrast, electro-conductive carbon black generally has a DBPA of greater than about 100 milliliters per 100 grams, such as from about 125 milliliters per 100 grams to greater than 300 milliliters per 100 grams. Thus, pigment carbon black is not as highly structured as electro-conductive carbon black, as evidenced by its lower DBPA. This means that an aggregate of pigment carbon black contains a lower number of particles and has a less complex structure than an electro-conductive carbon black, resulting in less voids within the aggregate. It is believed that this phenomenon contributes to the ability of the pigment carbon black, when compounded with the other components of the described polymer composition, to render the polymer composition laser weldable.

Regardless of the specific formulation of the black pigment concentrate used, the pigment carbon black can be present in the polymer composition in an amount ranging from about 0.01% by weight to about 2% by weight, such as in an amount ranging from about 0.1% by weight to about 1% by weight, such as in an amount ranging from about 0.25% by weight to about 0.75% by weight based on the total weight of the polymer composition.

High Flow Polyoxymethylene

In addition to the base polyoxymethylene, conductive filler, and pigment carbon black discussed above, the polymer composition can, in some embodiments, further comprise a high flow polyoxymethylene. The high flow polyoxymethylene, like the standard base polyoxymethylene discussed above, is generally an unbranched linear polymer that contains at least 80%, such as at least 90%, of oxymethylene units ($-CH_2O-$). The high flow polyoxymethylene is generally formed in the same manner as discussed above in reference to the standard base polyoxymethylene, with the exception that the high flow polyoxymethylene has an increased melt flow rate compared to that of the standard base polyoxymethylene.

Useful high flow polyoxymethylene resins are crystalline, and have a melt flow rate of from about 14 to about 55 grams per 10 minutes, such as CELCON® having a melt flow rate of from about 20 grams per 10 minutes to about 45 grams per 10 minutes at 190° C. and a 2.16 kilogram load in accordance with ASTM 01238-82.

Further, the high flow polyoxymethylene can be present in the polymer composition of the present disclosure in an amount ranging from about 1% by weight to about 25% by weight, such as in an amount ranging from about 2% by weight to about 20% by weight, such as in an amount ranging from about 3% by weight to about 15% by weight, based on the total weight of the polymer composition.

Additional Additives

In addition to the base polyoxymethylene, the conductive filler, the high flow polyoxymethylene, and the pigment carbon black discussed above, the polymer composition of the present disclosure can also contain additives such as, for example, antioxidants, acid scavengers, UV stabilizers or heat stabilizers. In addition, the composition can contain processing auxiliaries, for example adhesion promoters, lubricants, nucleants, demolding agents, fillers, reinforcing materials, or antistatic agents and additives which impart a desired property to the articles formed from the polymer composition.

For instance, in one embodiment, an ultraviolet light stabilizer may be present. The ultraviolet light stabilizer may comprise a benzophenone, a benzotriazole, or a benzoate. Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5-methylphenyl)-5-chlorobenzotriazole, 2,4-dihydroxybenzophenone, 2-hydroxy-4-methoxybenzophenone, 2-hydroxy-4-octoxybenzophenone, and 5,5-methylene bis(2-hydroxy-4-methoxybenzophenone); 2-(2'-hydroxyphenyl)benzotriazoles, e.g., 2-(2'-hydroxy-5'-methylphenyl)benzotriazole, 2-(2'-hydroxy-5-t-octylphenyl)benzotriazole, 2-(2'-hydroxy-3',5-di-t-butylphenyl)benzotriazole, 2-(2'-hydroxy-3',5'-di-t-butylphenyl)-5-chlorobenzotriazole, 2-(2'-hydroxy-3'-t-butyl-5-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g., 2-ethyl-2'-ethoxyoxanilide and 2-ethoxy-4'-dodecyloxanilide; cyanoacrylates, e.g., ethyl-α-cyano-β,β-diphenylacrylate and methyl-2-cyano-3-methyl-3-(p-methoxyphenyl)acrylate or mixtures thereof. A specific example of an ultraviolet light absorber that may be present is UV 234, which is a high molecular weight ultraviolet light absorber of the hydroxyl phenyl benzotriazole class. The UV light absorber, when present, can be present in the polymer composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

In one embodiment, the polymer composition may also include a formaldehyde scavenger, such as a nitrogen-containing compound. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyane diamide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are triamino-1,3,5-triazine (melamine) and its derivatives, such as melamine-formaldehyde condensates and methylol melamine. Oligomeric polyamides are also suitable in principle for use as formaldehyde scavengers. The formaldehyde scavenger may be used individually or in combination.

Further, the formaldehyde scavenger can be a guanidine compound which can include an aliphatic guanamine-based compound, an alicyclic guanamine-based compound, an aromatic guanamine-based compound, a hetero atom-containing guanamine-based compound, or the like. The formaldehyde scavenger can be present in the polymer composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

In one embodiment, the composition may also contain a nucleant. The nucleant may increase crystallinity and may comprise an oxymethylene terpolymer. In one particular embodiment, for instance, the nucleant may comprise a terpolymer of butanediol diglycidyl ether, ethylene oxide, and trioxane. The nucleant can be present in the composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (IRGANOX® 1010, BASF), triethylene glycol bis[3-(3-tert-butyl-4-hydroxy-5-methylphenyl)propionate] (IRGANOX® 245, BASF), 3,3'-bis[3-(3,5-di-tert-butyl-4-hydroxyphenyl)propionohydrazide] (IRGANOX® MD 1024, BASF), hexamethylene glycol bis[3-(3,5-di-tert-butyl-4-hydroxyphenyl)propionate] (IRGANOX® 259, BASF), and 3,5-di-tert-butyl-4-hydroxytoluene (LOWINOX® BHT, Chemtura). The antioxidant may be present in the polymer composition in an amount ranging from about 0.05% by weight to about 2% by weight, such as in an amount ranging from about 0.075% by weight to about 1.5% by weight, such as in an amount ranging from 0.1% by weight to about 1% by weight based on the total weight of the polymer composition.

Light stabilizers that may be present in addition to the ultraviolet light stabilizer in the composition include sterically hindered amines. Hindered amine light stabilizers that may be used include oligomeric compounds that are N-methylated. For instance, another example of a hindered amine light stabilizer comprises ADK STAB LA-63 light stabilizer available from Adeka Palmarole. The light stabilizers, when present, can be present in the polymer composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

In one embodiment, the composition may also contain one or more lubricants. The lubricant may comprise a polymer wax composition. Lubricants that may be included in the composition include, for instance, N,N'-ethylene bisstearamide or ethylene bis-stearamide (EBS) wax, which is based on monocarboxylic acids derived from naturally occurring vegetable oils. Further, in one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

In addition to the above components, the polymer composition may also contain an acid scavenger. The acid scavenger may comprise, for instance, an alkaline earth metal salt. For instance, the acid scavenger may comprise a calcium salt, such as a calcium citrate. The acid scavenger may be present in an amount ranging from about 0.001% by weight to about 1% by weight, such as in an amount ranging from about 0.002% by weight to about 0.5% by weight, such as from about 0.004% by weight to about 0.25% by weight based on the total weight of the polymer composition.

Further, the polymer composition may also contain a compatibilizer such as a phenoxy resin. Generally, the phenoxy resin can be present in the composition in an amount ranging from about 0.005% by weight to about 1% by weight, such as in an amount ranging from about 0.0075% by weight to about 0.5% by weight, such as in an amount ranging from about 0.01% by weight to about 0.25% by weight based on the total weight of the polymer composition based on the total weight of the polymer composition.

Compounding of the Polymer Composition and Forming Parts Therefrom

In order to form an article from the polymer composition of the present disclosure, the aforementioned components are compounded together to form a homogeneous blend which can be formed into any desired shape. The composition is compounded, for example, by intensively mixing or melt kneading the components at an elevated temperature, such as at a temperature that is higher than the melting point of the polyoxymethylenes utilized in the polymer composition. For instance, the components can be mixed at a temperature ranging from about 160° C. to about 250° C., such as at a temperature ranging from about 180° C. to about 220° C.

Alternatively, two or more of the components of the polymer composition of the present disclosure may be combined together separately before ultimately being compounded with the remaining components. For instance, the conductive filler and the high flow polyoxymethylene, if utilized, can be compounded separately in a 50:50 blend, after which this blend can be compounded with the remaining components of the polymer composition. Further, the high flow polyoxymethylene can itself be formed into a blend containing a portion of the formaldehyde scavengers, antioxidants, compatibilizers, and lubricants discussed above.

Figure 1:
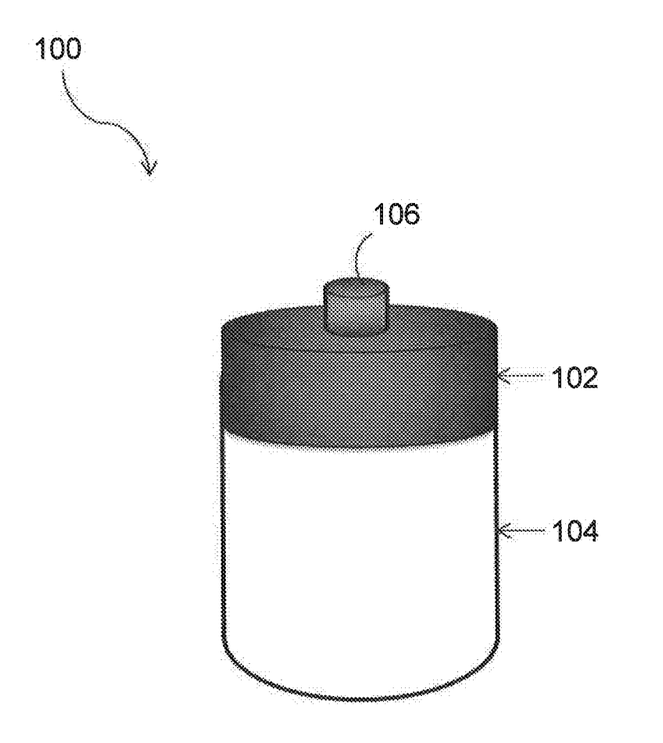
FIG. 1 shows a filter housing that is formed from a standard polyoxymethylene and the laser weldable, ESD polyoxymethylene of the present disclosure.

An almost limitless variety of polymer articles may be formed from the polymer composition of the present disclosure. Shaped articles can be made from the disclosed polymer composition according to the present disclosure using various different processes. In one embodiment, for instance, the shaped articles can be formed through extrusion, injection molding, or blow molding processes. Articles that can be formed from the polymer composition of the present disclosure include filter housings, flanges, pressure vessel connectors, fuel line connectors, or parts used to form such filter housings, flanges, or connectors. For example, FIG. 1 shows a filter housing that can be formed at least in part from the polymer composition of the present disclosure. In FIG. 1, a filter housing 100 is shown that includes two parts: (1) a part formed from the polymer composition of the present disclosure 102 and (2) a part formed from a standard natural polyoxymethylene 104 that is transparent to laser radiation. Parts 102 and 104 have been laser welded together to form the filter housing, and a sufficient weld is created due to the specific components of part 102, formed from the polymer composition of the present disclosure, which have been selected to impart the composition with the ability to absorb incident energy and convert it to heat efficiently to form a sufficient weld. The present disclosure may be better understood with reference to the following example, Example First, a polymer composition of the present disclosure was compounded and molded into a part of a filter housing. Then the part was laser welded to another part of a filter housing formed from a natural polyoxymethylene that is transparent to laser radiation and thus cannot absorb laser energy sufficiently. Then the burst pressure of the article at the weld interface was determined and compared to other POM grades to show that the parts were welded together sufficiently.

The weight percentages of each of the components in the example composition, based on the total weight of the polymer composition, are shown below in Table 1:

TABLE 1

| Component | Weight % Based on Total Weight of Example |
|---|---|
| Base polyoxymethylene with 9 g/10 minute melt flow rate | 81.76 |
| Stainless Steel Fibers | 6.19 |
| High flow polyoxymethylene with 45 g/10 minute melt flow rate | 6.12 |
| Ethylene-bis-stearamide (EBS) wax | 0.20 |
| Antioxidant | 0.36 |
| Formaldehyde Scavenger | 0.15 |
| Nucleant | 0.43 |
| RAVEN ® 2000 pigment carbon black | 0.50 |
| Additional components | 4.26 |
| Total | 100 |

The burst pressures of two filter housings formed by laser welding a part formed from the polymer composition shown in Table 1 with a part formed form a natural polyoxymethylene were determined, and both samples had a burst pressure of about 544 psi (37.5 bar). In comparison, the burst pressures of other traditional black polyoxymethylene grades had burst pressures ranging from about 360 psi (24.8 bar) to about 585 psi (40.3 bar). This indicates that the polymer composition of the present disclosure, which is ductile yet has ESD capabilities imparted by metal fibers such as stainless steel fibers, can be laser welded to natural polyoxymethylene and maintain a burst pressure in line with other grades of black polyoxymethylene.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A shaped article comprising a first part and a second part, the first part containing a first polymer composition, wherein the first polymer composition comprises:
a first polyoxymethylene, wherein the first polyoxymethylene has a melt flow rate of from about 3 grams per 10 minutes to about 55 grams per 10 minutes at 190° C. and a 2.16 kilogram load;
a conductive filler, wherein the conductive filler comprises a metal powder, metal flakes, metal fibers, or a combination thereof; and
a black pigment concentrate comprising pigment carbon black, wherein the pigment carbon black excludes electroconductive carbon black, wherein the first polymer composition is electrostatically dissipative, wherein the pigment carbon black has a dibutyl phthalate absorption of from about 40 milliliters per 100 grams to about 95 milliliters per 100 grams, as determined according to ASTM 2414, wherein the pigment carbon black is present in an amount ranging from about 0.25% by weight to about 0.75% by weight based on the total weight of the first polymer composition,
and the second part containing a natural polyoxymethylene that is transparent to laser radiation, wherein the first part and the second part are laser welded together.

2. The shaped article of claim 1, wherein the polymer composition further comprises a second polyoxymethylene, wherein the second polyoxymethylene has a melt flow rate of from about 14 grams per 10 minutes to about 55 grams per 10 minutes at 190° C. and a 2.16 kilogram load.

3. The shaped article of claim 1, wherein the polymer composition further comprises a thermoplastic elastomer and a coupling agent.

4. The shaped article of claim 1, wherein the polymer composition further comprises a polyalkylene glycol and a metal oxide.

5. The shaped article of claim 1, wherein the polymer composition further comprises, wherein the first polyoxymethylene is present in the polymer composition in an amount ranging from about 45% by weight to about 95% by weight based on the total weight of the polymer composition.

6. The shaped article of claim 1, wherein the conductive filler is present in the polymer composition in an amount ranging from about 1% by weight to about 25% by weight based on the total weight of the polymer composition.

7. The shaped article of claim 2, wherein the second polyoxymethylene is present in the polymer composition in an amount ranging from about 1% by weight to about 25% by weight based on the total weight of the polymer composition.

8. The shaped article of claim 1, wherein the shaped article comprises a filter housing, a flange, a fuel line connector, or a pressure vessel connector.

* * * * *